(12) United States Patent
Nicholson et al.

(10) Patent No.: US 9,285,969 B2
(45) Date of Patent: *Mar. 15, 2016

(54) USER INTERFACE NAVIGATION UTILIZING PRESSURE-SENSITIVE TOUCH

(71) Applicant: Lenovo (Singapore) Pte. Ltd., New Tech Park (SG)

(72) Inventors: John Weldon Nicholson, Cary, NC (US); James Stephen Rutledge, Cary, NC (US); Song Wang, Cary, NC (US); John Miles Hunt, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 78 days.

This patent is subject to a terminal disclaimer.

(21) Appl. No.: 14/263,531

(22) Filed: Apr. 28, 2014

(65) Prior Publication Data

US 2014/0237407 A1 Aug. 21, 2014

Related U.S. Application Data

(63) Continuation of application No. 13/477,145, filed on May 22, 2012, now Pat. No. 8,816,989.

(51) Int. Cl.
*G06F 3/045* (2006.01)
*G06F 3/0484* (2013.01)
*G06F 3/0488* (2013.01)
*G06F 3/041* (2006.01)

(52) U.S. Cl.
CPC .......... *G06F 3/04842* (2013.01); *G06F 3/0414* (2013.01); *G06F 3/0488* (2013.01); *G06F 3/04883* (2013.01); *G06F 3/04886* (2013.01); *G06F 2203/04105* (2013.01)

(58) Field of Classification Search
CPC . G06F 3/04883; G06F 3/0488; G06F 3/0414; G06F 3/04842; G06F 3/04886; G06F 2203/04105
See application file for complete search history.

(56) References Cited

U.S. PATENT DOCUMENTS

| | | | | |
|---|---|---|---|---|
| 2005/0099400 A1* | 5/2005 | Lee | ...................... | G06F 3/04883 345/173 |
| 2011/0050576 A1* | 3/2011 | Forutanpour | ....... | G06F 3/04886 345/168 |
| 2011/0102340 A1* | 5/2011 | Martin | .................. | G06F 1/1662 345/173 |
| 2011/0107212 A1* | 5/2011 | Jeong | .................... | G06F 3/0481 715/702 |
| 2011/0187655 A1* | 8/2011 | Min | ...................... | G06F 1/1643 345/173 |

* cited by examiner

*Primary Examiner* — Premal Patel
(74) *Attorney, Agent, or Firm* — John L. Rogitz; John M. Rogitz

(57) ABSTRACT

An approach is provided to direct data to different applications based upon the amount of pressure applied by a user of a pressure sensitive touch-enabled screen. In this approach, a touch input is received at a location of the pressure sensitive touch-enabled screen. The various applications currently being displayed at the location are identified along with the physical pressure level (amount of pressure applied) at the location on the pressure sensitive touch-enabled screen. One of the applications running on the device is selected based on the amount of pressure applied and the touch-based input provided by the user is directed to the selected application.

20 Claims, 6 Drawing Sheets

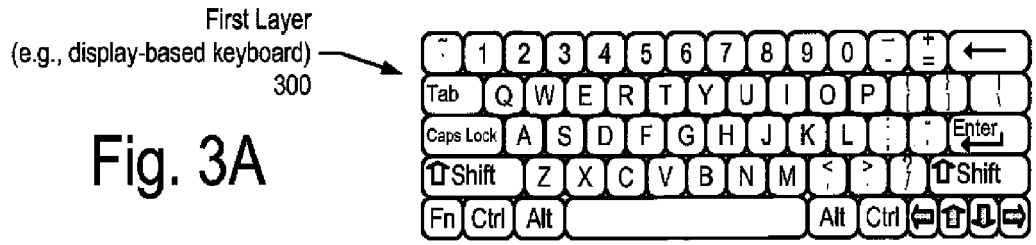
Fig. 3A — First Layer (e.g., display-based keyboard) 300
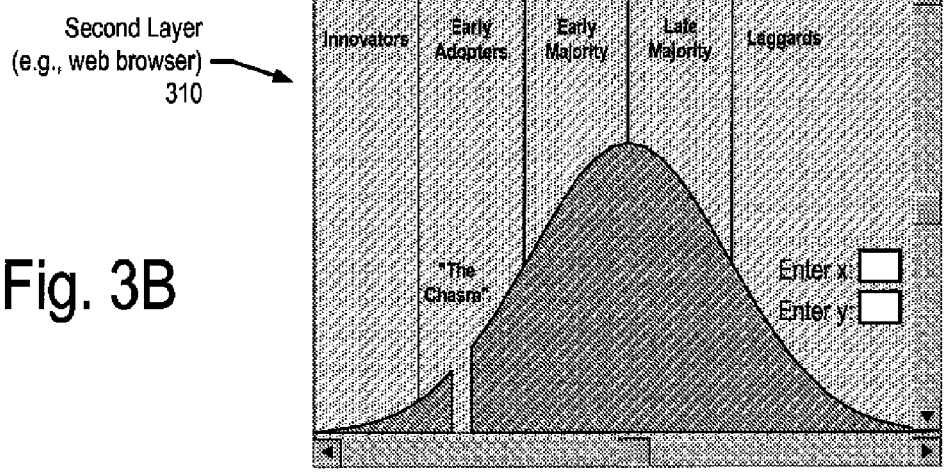
Fig. 3B — Second Layer (e.g., web browser) 310
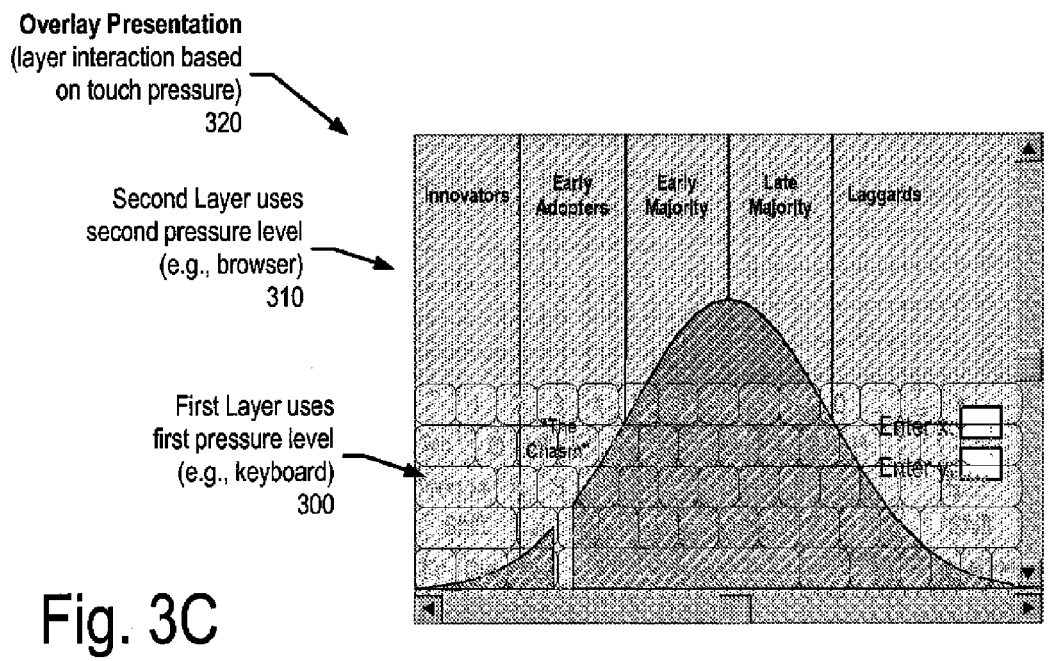
Fig. 3C — Overlay Presentation (layer interaction based on touch pressure) 320; Second Layer uses second pressure level (e.g., browser) 310; First Layer uses first pressure level (e.g., keyboard) 300

USER INTERFACE NAVIGATION UTILIZING PRESSURE-SENSITIVE TOUCH

BACKGROUND OF THE INVENTION

1. Technical Field

The present invention relates to navigate between applications using a touch enabled pressure-sensitive display screen.

2. Description of the Related Art

Touch enabled surfaces are input devices that translate the motion and position of a user's fingers to a relative position on a display screen. Touch pads are commonly integrated in smaller information handling systems, such as laptop computer systems, personal digital assistants (PDAs), some portable media players, and some mobile telephone devices. Touch enabled surfaces can be used instead of traditional mouse input devices and are preferred in some environments where space is limited, such as when working in confined spaces like that found on commercial airlines. Touch enabled surfaces can also provide display-based keyboards where the keys are rendered on the surface and the user types by touching the key spaces on the display. Using optical touch technology, a touch-enabled device functions when a finger or an object touches the surface which causes light to scatter. The reflection is caught with sensors or cameras that send the data to software which dictates response to the touch, depending on the type of reflection measured. Touch enabled devices can also be made pressure-sensitive by the addition of a pressure-sensitive coating that flexes differently depending on how firmly it is pressed, altering the reflection. Pressure sensors can also be included around the perimeter (e.g., on the corners, etc.) under the display screen so that amount of pressure applied can be determined based on the amount of pressure received by the various sensors.

SUMMARY

An approach is provided to direct data to different applications based upon the amount of pressure applied by a user of a pressure sensitive touch-enabled screen. In this approach, a touch input is received at a location of the pressure sensitive touch-enabled screen. The various applications currently being displayed at the location are identified along with the physical pressure level (amount of pressure applied) at the location on the pressure sensitive touch-enabled screen. One of the applications running on the device is selected based on the amount of pressure applied and the touch-based input provided by the user is directed to the selected application.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 3A is a diagram of a first application, such as a display-based keyboard, that can be displayed by the device;

FIG. 3B is a diagram of a second application, such as web page from a web browser, that can be displayed by the device;

FIG. 3C is a diagram of the pressure sensitive touch-enabled display screen displaying two applications, such as a browser application which is overlaid by another application, such as a display-based keyboard;

DETAILED DESCRIPTION

Figure 1:
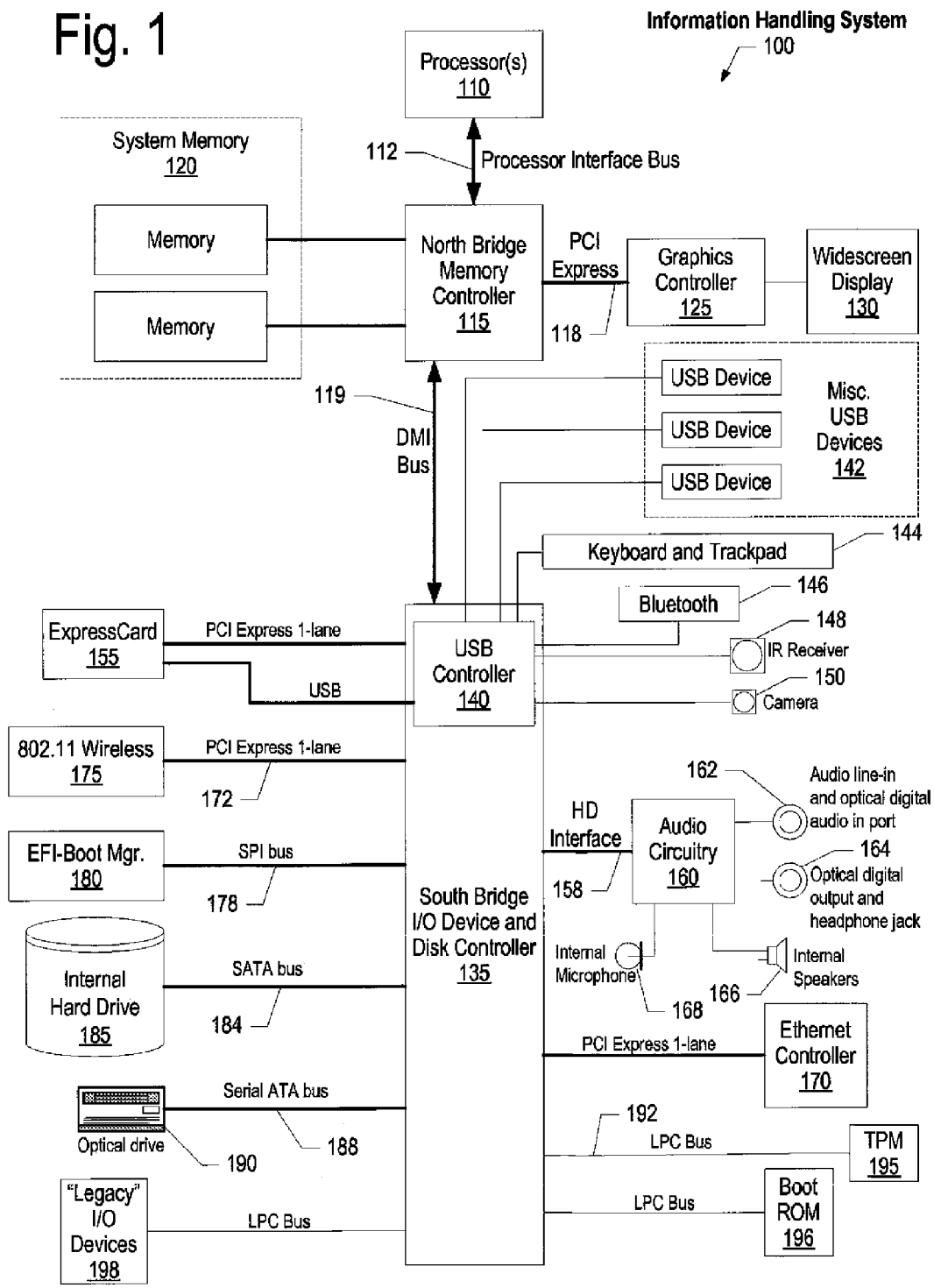
FIG. 1 is a block diagram of a data processing system in which the methods described herein can be implemented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclsoure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
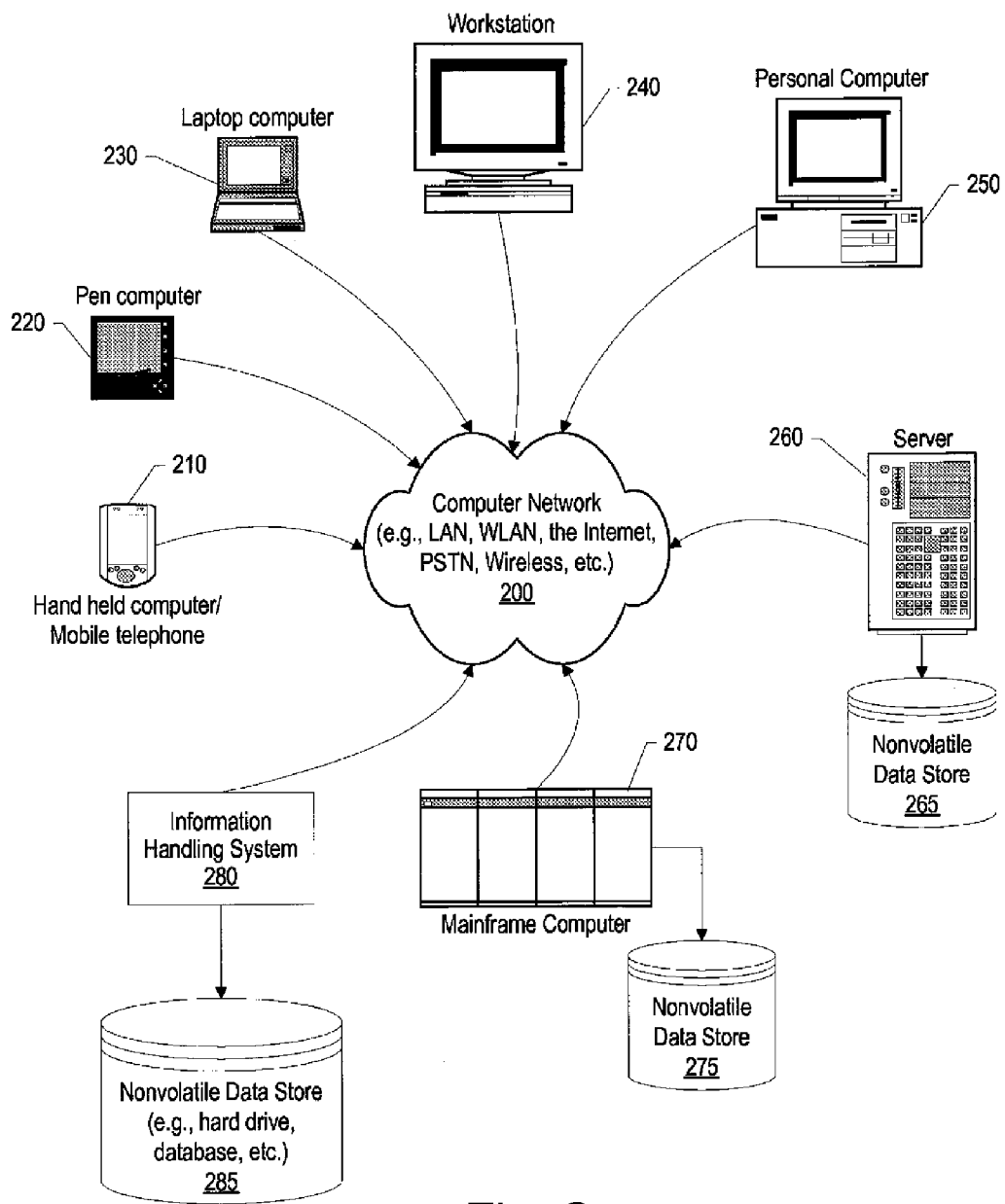
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to non-volatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280.

As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIG. 3A is a diagram of a first application, such as a display-based keyboard, that can be displayed by the device. First layer 300 shown in FIG. 3A is, in the example, a display-based keyboard used in a touch enabled screen environment. When displayed, the user can touch the display where a character of function is located and the system provides the input (e.g., character, control function, etc.) as if the user entered the data at a traditional keyboard.

FIG. 3B is a diagram of a second application, such as web page from a web browser, that can be displayed by the device. Second layer 310 shown in FIG. 3B is, in the example, a chart with text box input areas for entering "x" and "y" values is being displayed in the web browser. The user can select one of the text boxes by touching the desired text box and can then enter a value by using a keyboard, such as display based keyboard 300.

FIG. 3C is a diagram of the pressure sensitive touch-enabled display screen displaying two applications, such as a browser application which is overlaid by another application, such as a display-based keyboard. Overlay presentation 320 shows both layers being displayed with one of the layers overlaying the other layer. In the example shown, second layer 310 is a background (solid) layer and first layer 300 is shown overlaid so that both the chart and the display-based keyboard are simultaneously viewable. When both applications occupy the same location selected by the user using a touch enabled gesture (e.g., touching the screen with a finger or stylus, etc.), then the application that receives the input is based upon the amount of pressure applied by the user. For example, the input text boxes on the chart occupy the same location as some of the keys on the display-based keyboard. In order to interact with the first layer (the display-based keyboard), a first amount of pressure (first physical pressure level) is used. Likewise, in order to interact with the second layer (the input text boxes on the web browser), a second amount of pressure (second physical pressure level) is used. The first pressure can be set to be a heavier or lighter pressure than the second pressure. For example, the first physical pressure level can be set to a range of lighter pressure levels, whereas the second physical pressure level can then be set to a range of heavier pressure levels. In this manner, the user can interact with the desired user interface by using different amounts of physical pressure without having to rearrange the order of the displayed interfaces (e.g., without having to change the "focus" of interfaces, etc.).

Figure 4:
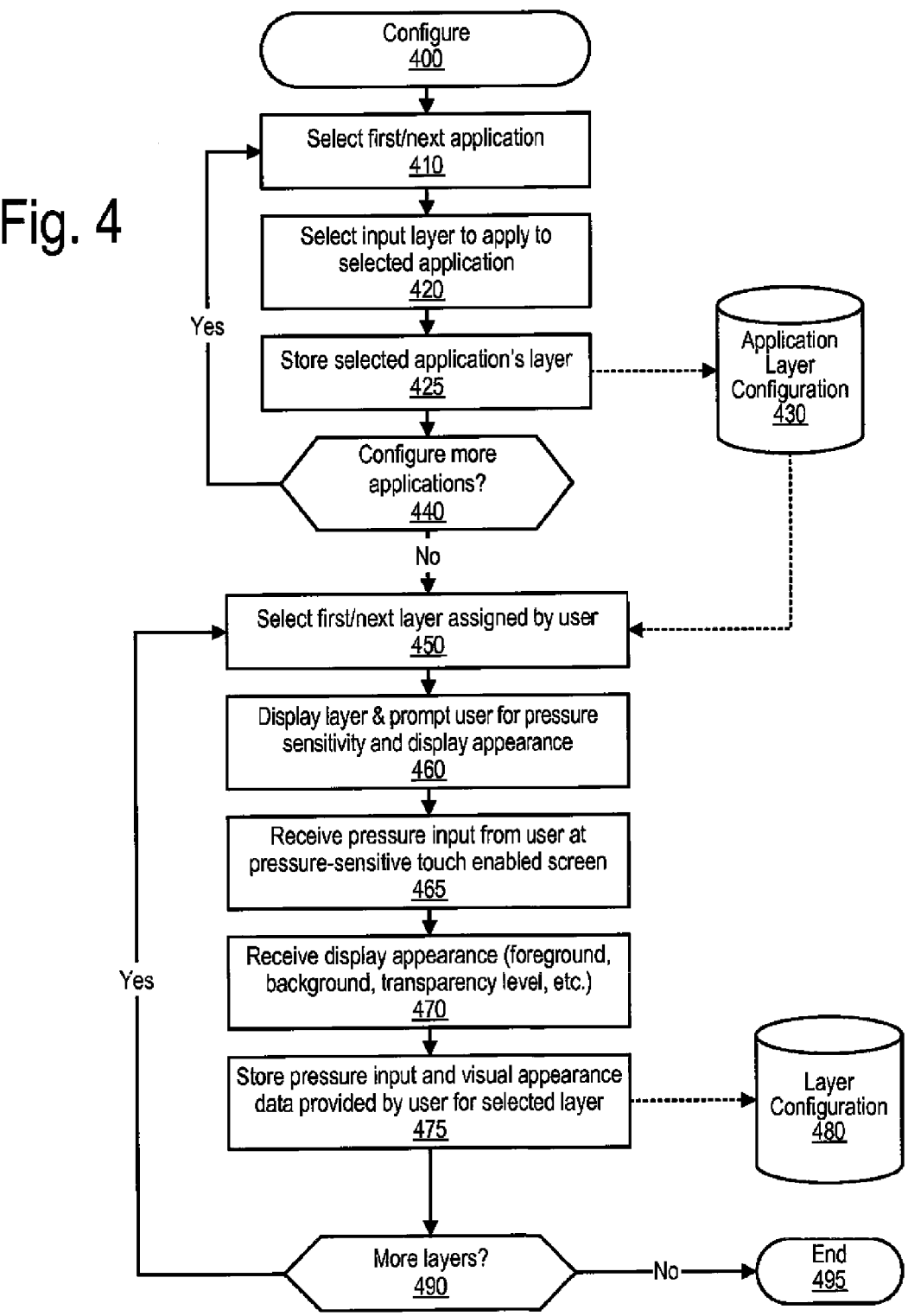
FIG. 4 is a flowchart showing configuration steps.

FIG. 4 is a flowchart showing configuration steps. Processing commences at 400 whereupon, at step 410, the user selects the first application that is desired for configuration (e.g., the display-based keyboard application, the web browser application, etc.). At step 420, the user selects a layer to apply to the selected application (e.g., the first layer, the second layer, the third layer, etc.). At step 425, the layer selected for the selected application is stored in data store 430. A determination is made as to whether there are more applications that the user wishes to configure (decision 440). If there are more applications that the user wishes to configure, then decision 440 branches to the "yes" branch which loops back to select and process the next desired application as described above. This looping continues until the user has selected all of the desired applications that the user wishes to configure, at which point decision 440 branches to the "no" branch. In one embodiment, a default layer can be assigned to applications that were not configured by the user.

At step 450, processing retrieves the first layer (from data store 430) that was assigned to one or more applications (e.g., the first layer, etc.). At step 460, the selected layer is displayed to the user and the user is prompted to provide a physical pressure level for the selected layer along with display attributes. At step 465, the physical pressure level is received by the user pressing on the pressure sensitive touch-enabled display surface whereupon the system records the pressure level. At step 470, the display appearance data is received from the user with the appearance data including factors such as whether the layer is displayed in the foreground (e.g., "on top" of applications in the background layer(s)), or background (e.g., "behind" applications in the foreground layer(s)), and what level of transparency is to be applied to a foreground layer (e.g., as a percentage with ten percent being not very transparent so the foreground layer application is easier to see but more obscures applications in the background layer(s) and ninety percent being very transparent so the foreground layer application is more difficult to see but provides little visual obstruction to applications in the background layer(s), etc.). At step 475, the physical pressure level (e.g., a value representing how hard the user pressed on the display surface) is stored in data store 480 along with the display appearance data provided by the user.

A determination is made as to whether there are more layers that need to be processed (decision 490). If there are more layers to process (e.g., the second layer, etc.), then decision 490 branches to the "yes" branch which loops back to receive pressure and appearance data for the next layer as described above. This looping continues until there are no more layers to process, at which point decision 490 branches to the "no" branch and configuration processing ends at 495.

Figure 5:
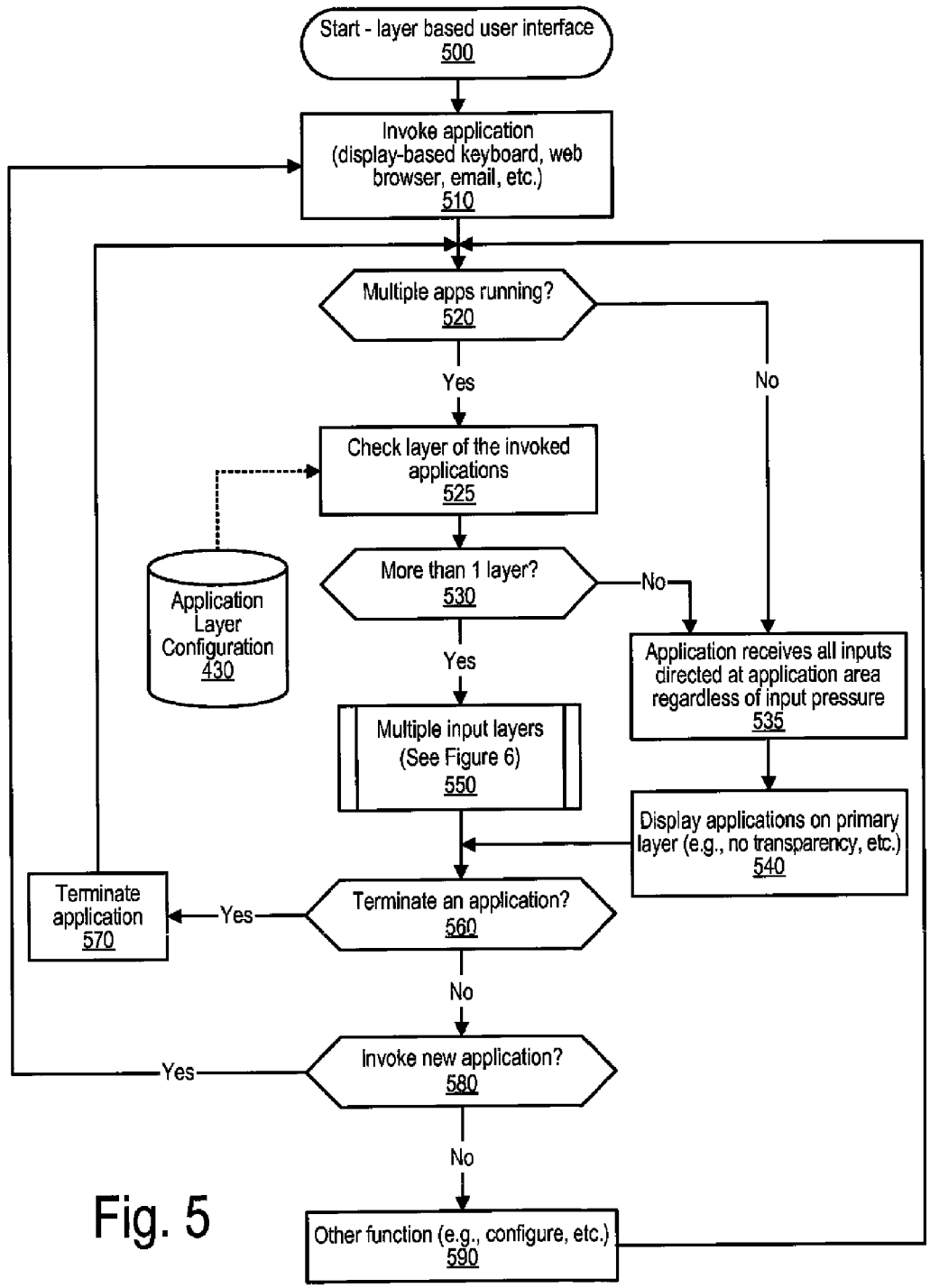
FIG. 5 is a flowchart showing steps taken to provide a layer based user interface based upon the amount of pressure applied by a user of the pressure sensitive touch-enabled display screen.

FIG. 5 is a flowchart showing steps taken to provide a layer based user interface based upon the amount of pressure applied by a user of the pressure sensitive touch-enabled display screen. Processing commences at 500 whereupon, at step 510, the user invokes an application (e.g., a display based keyboard, a web browser, an email application, etc.). A determination is made as to whether there are currently multiple applications with user interfaces running on the device (decision 520). If there are multiple applications running on the device, then decision 520 branches to the "yes" branch whereupon, at step 525, the layer assigned to each of the running applications is retrieved from data store 430 and checked. A determination is made as to whether there are applications assigned to more than one layer that are currently running on the device (decision 530). If there is only a single application running on the device (with decision 520 branching to the "no" branch) or if all of the applications running are at the same level (decision 530 branching to the "no" branch), then the application at the location where the user provides the touch-based input receives the input regardless of the input pressure (if multiple applications are at the same location on the display but each is assigned to the same level, then in one embodiment, traditional "focus" techniques are used to select an application and provide input). At step 540, all of the applications currently running are displayed in a traditional "primary" layer with no applications having a transparency appearance characteristic.

Figure 6:
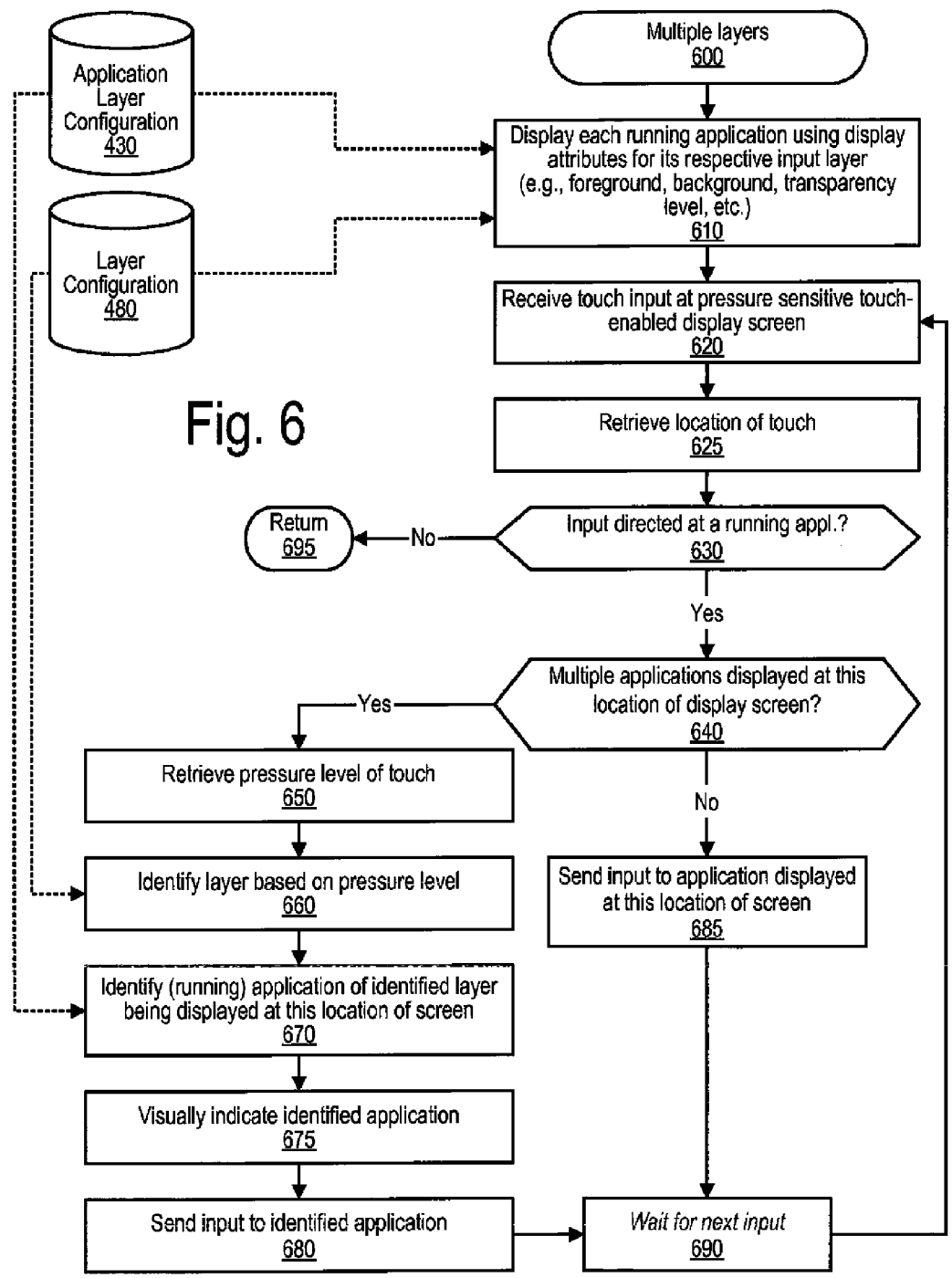
FIG. 6 is a flowchart showing further steps taken to direct input to a selected application when multiple applications are displayed at the location corresponding to the user's touch input on the pressure sensitive touch-enabled display screen.

Returning to decision 530, if there are multiple applications running and more than one layer assigned to the set of running applications, then decision 530 branches to the "yes" branch whereupon, at predefined process 550, multiple input layer processing is performed based on pressure sensitivity (see FIG. 6 and corresponding text for processing details).

A determination is made as to whether the user has decided to terminate one of the running applications (decision 560). If the user has terminated a running application, then decision 560 branches to the "yes" branch whereupon, at step 570, the application selected by the user is terminated. Processing then loops back to check the number of applications and number of layers currently running as described above. On the other hand, if the user has not chosen to terminate one of the running applications, then decision 560 branches to the "no" branch.

A determination is made as to whether the user has decided to invoke another application (decision 580). If the user has decided to invoke another application, then decision 580 branches to the "yes" branch which loops back to step 510 used to invoke the application and process the number of applications and number of layers as discussed above. On the other hand, if the user has not chosen to invoke another application, then decision 580 branches to the "no" branch whereupon, at step 590, the user performs some other layer-based function (e.g., configuring layer attributes as discussed in FIG. 4, etc.). After the other layer-based function is performed, processing loops back to check the number of applications and number of layers currently running as described above.

FIG. 6 is a flowchart showing further steps taken to direct input to a selected application when multiple applications are displayed at the location corresponding to the user's touch input on the pressure sensitive touch-enabled display screen. This processing is called from predefined process 550 shown in FIG. 5. The processing shown in FIG. 6 commences at 600 whereupon, at step 610, each of the running applications being displayed according to the display attributes assigned to the respective application's layer. Each application's layer is identified by reading the configuration values set in data store 430. Once a layer has been found, the display attributes used for the layer are retrieved from data store 480 (e.g., foreground, background, transparency level, etc.).

At step 620, processing receives a touch input (e.g., touched by a finger, stylus, etc.) on the pressure sensitive touch-enabled display surface. At step 625, the location of the touch is retrieved. A determination is made as to whether the touch input was directed at an area of the display occupied by at least one of the running applications (decision 630). If the input was directed at an area of the display occupied by at least one of the running application, then decision 630 branches to the "yes" branch for further processing.

A determination is made as to whether there are more than one running application currently being displayed at the location of the display where the user provided the touch input (decision 640). If there are more than one running application currently being displayed at the location, then decision 640 branches to the "yes" branch to determine which of the running applications should receive the input. At step 650, the physical pressure level that was applied by the user when making the touch input is retrieved. At step 660, one of the layers is identified by comparing the retrieved physical pressure level with the physical pressure levels configured for the various layers. As previously described, the physical pressure levels can be grouped into "ranges" (e.g., soft pressure, firm pressure, etc.). At step 670, one of the running applications is identified based on the identified application being displayed at the location of the touch input as well as the identified application having an assigned layer that matches the layer corresponding to the retrieved physical pressure level applied at the touch location. In one embodiment, the identified application is visually indicated (e.g., visually making the identified application "blink", brought completely to the foreground, etc.). In a further embodiment, the visually indication of the identified application is performed for a brief period of time (e.g., one second, etc.) following the identification of the application. The visual indication of the identified application is performed at step 675. At step 680, the touch input is sent to the identified application for further processing (e.g., touch of a key on a display-based keyboard, touch of an input text box on a web browser or form, etc.). Processing then waits for the next input to arrive at 690. When the next touch-based input arrives, processing loops back to receive and process the input as described above.

Returning to decision 640, if only a single application is displayed at the location of the display where the user touched the display, then decision 640 branches to the "no" branch. Here, at step 685, input is sent to the only application being displayed at this location regardless of the pressure applied by the user when touching the display screen. Processing then waits for the next input to arrive at 690. When the next touch-based input arrives, processing loops back to receive and process the input as described above.

The looping back to process touch-based inputs continues until the user directs the input away from a running application. When this occurs, then decision 630 branches to the "no" branch whereupon processing returns to the calling routine (see FIG. 5) at 695.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, comprising:
    receiving an input at a location on a pressure sensitive touch-enabled screen;
    identifying at least first and second applications respectively presenting first and second layers at the location, wherein the first layer for the first application is associated with a first range of physical pressure levels and the second layer for the second application is associated with a second range of physical pressure levels different from the first range of physical pressure levels;
    identifying a physical pressure level of the input on the pressure sensitive to-enabled screen;
    determining one layer of the first and second layers to which to direct the input based on a comparison of the physical pressure level of the input to the first and second ranges of physical pressure levels; and
    directing the input to the determined layer.

2. The method of claim 1, further comprising:
    displaying the first layer using a first set of display attributes, wherein the first set of display attributes includes an attribute to display the first layer as a solid background; and
    displaying the second layer using a second set of display attributes, wherein the second set of display attributes includes an attribute to display the second layer as an at least partially-transparent overlay on top of the first layer so that both the first and second layers are visible at the location.

3. The method of claim 2, further comprising:
    preparing a plurality of sets of display attributes, including the first and second sets of display attributes; and
    assigning a unique one of the layers to each of the plurality of sets of display attributes.

4. The method of claim 1, further comprising:
    receiving a subsequent input at a second location of the pressure sensitive touch-enabled screen;
    determining that a single layer is being displayed at the second location; and
    directing the subsequent input to the single layer regardless of the physical pressure applied.

5. The method of claim 1, further comprising:
    visually indicating the one of the first and second layers to which to direct the input.

6. The method of claim 5, wherein the visually indicating ceases after a period of time following the reception of the input.

7. The method of claim 1, wherein the layer of the first and second layers determined to be the layer to which to direct input is determined by determining that the physical pressure level of the input is within the range of one of the first range and the second range.

8. The method of claim 1, wherein the first layer is a browser window for a browser application and the second layer is a representation of a keyboard.

9. The method of claim 1, wherein at least one of the first and second ranges are established at least in part based on user input during a configuration of the respective application associated with the respective at least one of the first and second ranges to be established, the input being input to the display of a first physical pressure level, the first physical pressure level being used to at least in part establish the respective range by establishing the respective range to include the first physical pressure level.

10. A computer readable storage medium that is not a transitory signal, the computer readable storage medium bearing instructions executable by a processor to:

receive an input at a location on a pressure sensitive touch-enabled screen;

identify at least first and second applications respectively presenting first and second layers at the location, wherein the first layer for the first application is associated with a first range of physical pressure levels and the second layer for the second application is associated with a second range of physical pressure levels different from the first range of physical pressure levels;

identify a physical pressure level of the input on the pressure sensitive touch-enabled screen;

determine one layer of the first and second layers to which to direct the input based on a comparison of the physical pressure level of the input to the first and second ranges of physical pressure levels; and direct the input to the determined layer.

11. The computer readable storage medium of claim 10, wherein the instructions are further executable by a processor to:

display the first layer using a first set of display attributes, wherein the first set of display attributes includes an attribute to display the first layer as a solid background; and display the second layer using a second set of display attributes, wherein the second set of display attributes includes an attribute to display the second layer as an at least partially-transparent overlay on top of the first layer so that both the first and second layers are visible at the location.

12. The computer readable storage medium of claim 11, wherein the instructions are further executable by a processor to:

prepare a plurality of sets of display attributes, including the first and second sets of display attributes; and assign a unique one of the layers to each of the plurality of sets of display attributes.

13. The computer readable storage medium of claim 10, wherein the instructions are further executable by a processor to:

receive a subsequent input at a second location of the pressure sensitive touch-enabled screen;

determine that a single layer is being displayed at the second location; and direct the subsequent input to the single layer regardless of the physical pressure applied.

14. The computer readable storage medium of claim 10, wherein the instructions are further executable by a processor to:

visually indicate the one of the first and second layers to which to direct the input, wherein the visual indication is removed after a period of time following the reception of the input.

15. The computer readable storage medium of claim 14, wherein the visual indication is removed after a threshold of time following the reception of the input.

16. The computer readable storage medium of claim 10, wherein the layer of the first and second layers determined to be the layer to which to direct input is determined by determining that the physical pressure level of the input is within the range of one of the first range and the second range.

17. The computer readable storage medium of claim 10, wherein the first layer is a browser window for a browser application and the second layer is a representation of a keyboard.

18. The computer readable storage medium of claim 10, wherein at least one of the first and second ranges are established at least in part based on user input during a configuration of the respective application associated with the respective at least one of the first and second ranges to be established, the input being input to the display of a first physical pressure level, the first physical pressure level being used to at least in part establish the respective range by establishing the respective range to include the first physical pressure level.

19. A device, comprising:
a touch-enabled display;
a processor; and
a memory accessible to the processor and bearing instructions executable by the processor to:

receive an input at a location on the touch-enabled display;

identify at east first and second windows being presented at the location, wherein the first window is associated with a first range of pressure levels and the second window is associated with a second range of pressure levels different from the first range of pressure levels;

determine a pressure level pertaining to the input on the touch-enabled display;

determine one window of the first and second windows to which to direct the input based on a determination of which of the first and second ranges of pressure levels the pressure level of the input is within; and direct the input to the determined window.

20. The device of claim 19, wherein the first window is associated with a first application and wherein the second window is associated with a second application different from the first application.

* * * * *